United States Patent [19]

Nagaoka et al.

[11] Patent Number: 5,561,186
[45] Date of Patent: Oct. 1, 1996

[54] RESIN COMPOSITION HAVING IMPROVED RECYCLING PROPERTY

[75] Inventors: Kenji Nagaoka; Kaoru Kitadono; Yasuro Suzuki, all of Chiba, Japan

[73] Assignee: Sumitomo Chemical Company, Limited, Osaka, Japan

[21] Appl. No.: 466,885

[22] Filed: Jun. 6, 1995

Related U.S. Application Data

[63] Continuation of Ser. No. 54,247, Apr. 30, 1993, abandoned.

[30] Foreign Application Priority Data

Apr. 30, 1992 [JP] Japan ..................................... 4-111267

[51] Int. Cl.$^6$ ..................................... C08L 51/00
[52] U.S. Cl. ............................. 524/538; 524/433
[58] Field of Search ..................................... 524/538, 433

[56] References Cited

U.S. PATENT DOCUMENTS 4,600,741   7/1986   Aycock et al. ........................... 524/538
4,822,836   4/1989   Wroczynski ............................. 524/538
5,036,127   7/1991   Veno et al. .............................. 524/433

FOREIGN PATENT DOCUMENTS 058479   4/1982   Japan ..................................... 524/433

*Primary Examiner*—Edward J. Cain
*Attorney, Agent, or Firm*—Sughrue, Mion, Zinn, Macpeak & Seas

[57] ABSTRACT

A resin composition having an improved recycling property comprising;
 (a) from 5 to 95 parts by weight of a poly-phenylene ether,
 (b) from 95 to 5 parts by weight of a polyamide,
 (c) from 0 to 30 parts by weight per 100 parts by weight of [(a)+(b)] of a compatibilizing agent,
 (d) from 0.001 to 10 parts by weight per 100 parts by weight of [(a)+(b)] of an alkali earth metal oxide,
 (e) from 0 to 100 parts by weight per 100 parts by weight of [(a)+(b)] of a rubbery material, and
 (f) from 0 to 200 parts by weight per 100 parts by weight of [(a)+(b)] of an inorganic filler.

11 Claims, No Drawings

RESIN COMPOSITION HAVING IMPROVED RECYCLING PROPERTY

This is a continuation of application Ser. No. 08/054,247 filed Apr. 30, 1993, now abandoned.

FIELD OF THE INVENTION

The present invention relates to a resin composition comprising a polyphenylene ether (PPE) and a polyamide (PA), the composition showing a small change in melt flowability before and after molding the composition and being suitable for recycling.

BACKGROUND OF THE INVENTION

A PPE resin is a thermoplastic resin having excellent various properties such as mechanical properties, a heat resistance, a dimensional stability, etc. However, the PPE resin is very poor in impact characteristics and solvent resistance by itself, and also is poor in processability due to a high melt viscosity thereof.

On the other hand, a PA resin is a thermoplastic resin having characteristics of excellent mechanical properties, solvent resistance, processability, etc., but the resin is poor in impact resistance, heat resistance, etc., and is also greatly poor in dimensional stability due to a large water absorption property thereof. Further, the PA resin shows severe decrease in mechanical characteristics due to water absorption.

Thus, it has been proposed to blend both the resins to supplement the faults of these resins each other.

However, a simple blend of these resins loses good mechanical characteristics of these resins. Thus, it has been proposed to attain the improvement on the mechanical properties of the resin blend by adding a compatibilizing agent to the mixture at blending the PPE resin and the PA resin to improve dispersibility. These methods are disclosed in JP-B-60-11966, JP-B-61-10494 (the term "JP-B" as used herein means an "examined published Japanese patent application"), JP-A-59-66452, JP-A-56-49753, (the term "JP-A" as used herein means an "unexamined published Japanese patent application"), etc. The PPE/PA series resin composition thus obtained has been used in electric and electronic fields and automobile field as a material having excellent mechanical properties, heat resistance, solvent resistance, processability, dimensional stability, and hygroscopic properties.

Recently, a natural environmental disruption by industrial activities has been noticed and resource saving has become an important problem. In the field of resins, the re-utilization of resins by recycling has been positively proceeded.

However, in the above-described PPE/PA resin composition, etc., if recycling of the resin composition by, for example, injection molding is conducted, a phenomenon occurs that the flowability is greatly increased due to deterioration of the resin composition. Also, in a system of compounding a talc, etc., with the resin composition, a phenomenon occurs that the flowability is conversely decreased. Accordingly, when a mixture of a virgin resin and a recycled resin is molded, the melt flowability of the mixed resin composition is greatly changed with the mixing ratio.

Thus, if the molding conditions are not controlled with every change of the mixing ratio of the resins, moldings showing a large shrinkage or defective molding products having burrs at the circumferences are formed, resulting in a serious problem for the quality control.

Therefore, a resin showing small change in the melt flowability at recycling has been required.

SUMMARY OF THE INVENTION

Accordingly, an object of the present invention is to provide a PPE/nylon resin composition which shows small change in melt flowability before and after molding, is suitable for recycling, and provides a molded product having good shape and appearance.

As a result of various investigations in view of the circumstances as described above, it has been found that if an alkali earth metal oxide is added to a PPE/PA resin composition, a molded product of the resin composition having a good appearance can be obtained in a stable manner without substantially changing the melt flowability even by recycling and even by a long retention in an injection molding machine. The present invention has been attained based on this finding.

The resin composition having improved recycling property according to the present invention comprises;

(a) from 5 to 95 parts by weight of a polyphenylene ether, (b) from 95 to 5 parts by weight of a polyamide, (c) from 0 to 30 parts by weight per 100 parts by weight of [(a)+(b)] of a compatibilizing agent, (d) from 0.001 to 10 parts by weight per 100 parts by weight of [(a)+(b)] of an alkali earth metal oxide, (e) from 0 to 100 parts by weight per 100 parts by weight of [(a)+(b)] of a rubbery material, and (f) from 0 to 200 parts by weight per 100 parts by weight of [(a)+(b)] of an inorganic filler.

DETAILED DESCRIPTION OF THE INVENTION

The present invention is described in detail below.

The polyphenylene ether (a) used in the present invention is a polymer obtained by oxidative-polymerizing at least one phenol compound represented by following formula (1) with oxygen or an oxygen-containing gas using an oxidative coupling catalyst.

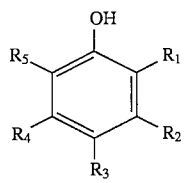

(1)

wherein $R_1$, $R_2$, $R_3$, $R_4$, and $R_5$ each represents a hydrogen atom, a halogen atom, a hydrocarbon group, or a substituted hydrocarbon group, with proviso that at least one of $R_1$ to $R_5$ is a hydrogen atom.

Examples of $R_1$, $R_2$, $R_3$, $R_4$, and $R_5$ in formula (1) are hydrogen, chlorine, bromine, fluorine, iodine, methyl, ethyl, n-propyl, iso-propyl, pri-butyl, sec-butyl, t-butyl, chloroethyl, hydroxyethyl, phenylethyl, benzyl, hydroxymethyl, carboxymethyl, methoxycarbonylethyl, cyanoethyl, phenyl, chlorophenyl, methylphenyl, dimethylphenyl, ethylphenyl, and allyl.

Examples of the phenol compound represented by formula (1) are phenol, o-cresol, m-cresol, p-cresol, 2,6-dimethylphenol, 2,5-dimethylphenol, 2,4-dimethylphenol, 3,5-dimethylphenol, 2-methyl-6-phenylphenol, 2,6- diphenylphenol, 2,6-diethylphenol, 2-methyl-6-ethylphenol, 2,3,5-trimethylphenol, 2,3,6-trimethylphenol, 2,4,6-trimethylphenol, 3-methyl-6-t-butylphenol, thymol, and 2-methyl-6-allylphenol.

Furthermore, a copolymer of the phenol compound represented by formula (1) described above and phenol compounds other than the phenol compound of formula (1), e.g., a polyhydric hydroxyaromatic compound such as bisphenol A, tetrabromobisphenol A, resorcinol, hydroquinone, a novolac resin, etc., can be used as the polyphenylene ether (a).

Of those compounds, preferred compounds are a homopolymer of 2,6-dimethylphenol or 2,6-diphenylphenol and a copolymer of a large proportion (i.e., 50 wt % or more) of 2,6-xylenol and a small proportion (i.e., 50 wt % or less) of 3-methyl-6-t-butylphenol or 2,3,6-trimethylphenol.

There is no particular limitation on the oxidative coupling catalyst used in the oxidative polymerization of the phenol compound, and any catalysts having a polymerizability can be used.

Furthermore, the polyphenylene ether (a) in the present invention includes a mixture of the above-described polyphenylene ether and a styrene resin (styrene polymer), and a graft polymer of the polyphenylene ether with other polymer.

The above-described styrene resin is a polymer comprising at least one monomer unit selected from styrene, α-methylstyrene, p-methylstyrene, etc. Examples of the resin are polystyrene, rubber-reinforced polystyrene, poly α-methylstyrene, poly p-methylstyrene, a styrene-acrylonitrile copolymer, etc.

The amount of the styrene resin mixed or grafted is preferably 500 parts by weight or less per 100 parts by weight of the polyphenylene ether. If the amount of the styrene resin is larger than 500 parts by weight, the heat resistance of the resulting thermoplastic resin composition is undesirably greatly decreased.

The polyamide (b) used in the present invention is at least one polyamide selected from homopolyamides or copolyamides obtained by polymerization of lactam or an aminocarboxylic acid or obtained by polycondensation of diamine and a dicarboxylic acid or a mixture of these polyamides.

Examples of the polyamide (b) used in the present invention are nylon 6, nylon 66, nylon 64, nylon 10, nylon 11, nylon 12, nylon MXD6 which is the copolymer of m-xylenediamine and adipic acid, a nylon 66/6 copolymer, a copolyamide (nylon AHBA/6) of para-aminomethylbenzoic acid and ε-caprolactam, and a polyamide (nylon THDT or nylon THDT/6I) comprising 2,2,4-/2,4,4-trimethylhexamethylenediamine terephthalates. However, the polyamide (b) used is not limited to those compounds.

The ratio of the polyphenylene ether (a) and the polyamide (b) compounded in the present invention is in the range from 5 to 95 parts by weight, preferably from 20 to 80 parts by weight of the polyphenylene ether (a), and from 95 to 5 parts by weight, preferably from 80 to 20 parts by weight of the polyamide (b), the sum of (a) and (b) being 100 parts by weight.

The compatibilizing agent (c) used in the present invention is compounded to improve the disadvantage that since the polyphenylene ether (a) inherently has a poor affinity with the polyamide (b), even when they are simultaneously melt-kneaded, the polyphenylene ether particles are dispersed only where the particle size thereof is about 10 μm or more, thereby merely exhibiting a very low mechanical property. Examples thereof are at least one compound selected from the following groups A) to F).

A) Compounds each simultaneously having a) a carbon-carbon double bond or a carbon-carbon triple bond and b) a carboxyl group, an acid anhydride group, an amino group, an acid amide group, an imido group, an epoxy group, a carboxylic acid ester group, an isocyanate group, a methylol group, a group having an oxazoline ring, or a hydroxyl group, in the molecule. Examples of the compound of the group A) are maleic acid, maleic anhydride, fumaric acid, an unsaturated amine, and glycidyl methacrylate. The details of those compounds are described in JP-A-56-26913, JP-A-56-49753, etc.

B) Saturated aliphatic polycarboxylic acids represented by the following formula and the derivatives thereof.

$$(R_1O)_mR(COOR_2)_n(CONR_3R_4)_s$$

wherein R represents a straight chain or branched aliphatic hydrocarbon having from 2 to 20, preferably from 2 to 10, carbon atoms; $R_1$ represents a hydrogen atom, an alkyl group, an aryl group, an acyl group, or a carbonyldioxy group and is particularly preferably a hydrogen atom; $R_2$ represents a hydrogen atom, an alkyl group having from 1 to 20, preferably from 1 to 10, carbon atoms, or an aryl group having 20 or less, preferably 10 or less, carbon atoms; $R_3$ and $R_4$ each represents a hydrogen atom, an alkyl group having from 1 to 10, preferably from 1 to 6, more preferably from 1 to 4, carbon atoms, or an aryl group having 10 or less, preferably 6 carbon atoms; m represents 1; n+s is an integer of 2 or more, preferably 2 or 3; n represents an integer of 0 or more; s represents an integer of 0 or more; $(R_1O)$ is located at α-position or β-position of the carbonyl group; and from 2 to 6 carbon atoms exist between at least two carbonyl groups.

Examples of the compound represented by the above formula are the ester compounds, amide compounds, anhydrides, hydrates, salts, etc., of the saturated aliphatic polycarboxylic acid. Examples of the saturated aliphatic polycarboxylic acid are citric acid, malic acid, agaricic acid, etc. The details of those compounds are described in Tokuhyou Sho 61-502195 (PCT Japanese patent application No. 61-502195).

C) Compounds represented by the following formula;

$$(I)\text{-}Z\text{-}(II)$$

wherein (I) represents a group represented by formula (X—CO)—wherein X represents F, Cl, B, I, OH, OR or —O—CO—R wherein R represents a hydrogen atom, an alkyl group, or an aryl group; (II) represents a carboxylic acid group, an acid anhydride group, an acid amide group, an imido group, a carboxylic acid ester group, an amino group, or a hydroxyl group; Z represents a divalent hydrocarbon bond; and the groups represented by (I) and (II) are covalent-bonded through Z.

Examples of the compound are chloroformyl succinic anhydride, chloroethanoylsuccinic anhydride, trimellitic anhydride acid chloride, trimellitic anhydride acetic anhydride, and terephthalic acid chloride.

D) Silane compounds each having a) at least one silicon atom bonded to the carbon atom through an oxygen linkage and b) at least one functional group selected from an ethylenical carbon-carbon double bond, an ethylenical carbon-carbon triple bond, an amino group, a mercapto group, the ethylenical carbon-carbon double bond + the amino group, the ethylenical carbon-carbon double bond + the mercapto group, the ethylenical carbon-carbon triple bond + the amino group, and the ethylenical carbon-carbon triple bond + the mercapto group, wherein the functional group is not bonded to the silicon atom of the silane compound.

E) Oxidized polyolefin wax.

F) A copolymer having a unit of a vinyl aromatic compound and a unit of an $\alpha,\beta$-unsaturated dicarboxylic acid or dicarboxylic anhydride or a copolymer having a unit of a vinyl aromatic compound and a unit of an imido compound of an $\alpha,\beta$-unsaturated dicarboxylic acid.

The compatibilizing agent used in the present invention is not limited to the above-described compounds and any compounds which are generally used to improve the compatibility of PPE and nylon can be used in the present invention.

The compatibilizing agents may be used alone or as a mixture thereof.

The amount of the compatibilizing agent (c) used in the present invention is from 0 to 30 parts by weight per 100 parts by weight of the total amount of the polyphenylene ether (a) and the polyamide (b), i.e., [(a)+(b)]. If the amount thereof is over 30 parts by weight, deterioration of the heat resistance and great decrease of the strength due to decomposition, etc., of the resin composition undesirably occur. The preferred compounding amount of the compatibilizing agent is from 0.05 to 25 parts by weight. Furthermore, the compatibilizing agent (c) may be compounded together with a radical initiator such as an organic peroxide.

Preferable alkali earth metal oxide (d) used in the present invention is an oxide such as beryllium oxide, magnesium oxide, calcium oxide, strontium oxide, barium oxide, radium oxide, etc., and these oxides may be used alone or as a mixture thereof. More preferable alkali earth metal oxides are magnesium oxide and calcium oxide.

Those alkaline earth metal oxides easily react with water to form hydroxides, and the resulting hydroxides are stable even at relatively high temperatures.

The amount of the alkali earth metal oxide (d) used in the present invention is from 0.001 to 10 parts by weight per 100 parts by weight of [(a)+(b)]. If the amount thereof is less than 0.001 part by weight, the improving effect is small, while if the amount thereof is over 10 parts by weight, deterioration of the physical properties of the resin composition is undesirably large.

The amount of the alkali earth metal oxide (d) is preferably from 0.01 to 5 parts by weight, and more preferably from 0.1 to 3 parts by weight.

The rubbery material (e) used in the present invention includes natural and synthetic polymer materials which are elastic materials at room temperature, and any rubbery resins which are used to improve the impact characteristics of the PPE/PA resin compositions can be used.

Examples of particularly preferred rubbery materials used in the present invention are an ethylene-propylene rubber, an ethylene-propylene-non-conjugated diene rubber, an ethylene-butene rubber, a polybutadiene rubber, a styrene-butadiene block copolymer rubber, a styrene-butadiene copolymer rubber, a partially hydrogenated styrene-butadiene-styrene block copolymer rubber, a styrene-isopropylene block copolymer rubber, a partially hydrogenated styrene-isopropylene block copolymer rubber, a polyurethane rubber, a styrene-grafted-ethylene-propylene-non-conjugated diene rubber, a styrene-grafted-ethylene-propylene rubber, a styrene/acrylonitrile-grafted-ethylene-propylene-non-conjugated diene rubber, a styrene/acrylonitrile-grafted-ethylene-propylene rubber, etc., and mixtures of them. Also, modified rubbers modified with a functional monomer containing an acid, an epoxy, etc., can be used in the present invention.

The amount of the rubbery material (e) compounded is from 0 to 100 parts by weight per 100 parts by weight of [(a)+(b)]. Preferably, the amount is from 0 to 70 parts by weight per 100 parts by weight of [(a)+(b)]. If the amount of the rubbery material is over 100 parts by weight, the rigidity of the resin composition is greatly decreased, which is undesirable in the present invention.

The filler (f) compounded with the resin composition in the present invention is generally compounded to improve the rigidity and the hardness of the resin composition. Examples of the suitable filler are calcium carbonate, magnesium carbonate, aluminum hydroxide, magnesium hydroxide, zinc oxide, titanium oxide, aluminum silicate, magnesium silicate, calcium silicate, silicic acid, calcium silicate hydrate, aluminum silicate hydrate, mica, mineral fibers, xonotlite, potassium titanate whiskers, magnesium oxysulfate, glass baloons, glass fibers, glass beads, carbon fibers, stainless steel fibers, aramide fibers, carbon black, etc. Those fillers can be used alone or as a mixture thereof. Also, the filler used in the present invention is not limited to those materials.

The amount of the filler (f) used in the present invention is from 0 to 200 parts by weight per 100 parts by weight of [(a)+(b)], preferably, from 0 to 100 parts by weight per 100 parts by weight of [(a)+(b)]. If the amount of the filler is over 200 parts by weight, the impact resistance of the resin composition is greatly decreased and the flowability of the resin composition at molding is greatly decreased, which are undesirable in the present invention.

The thermoplastic resin composition of the present invention is obtained by compounding the abovedescribed components (a) to (f) by conventional method and melt kneading the mixture. In this case, the compounding and kneading order of those components is optional, e.g., each combination of desired components is separately kneaded and all the components are then compounded and kneaded, or plural feed inlets are formed in one extruding machine along the cylinder thereof and each component is successively fed into the extruding machine.

The thermoplastic resin composition of the present invention may further contain conventional additives such as a flame retardant, a plasticizer, an antioxidant, a weather-resistant agent, etc. In particular, when materials which are known as additives for polyphenylene ethers or nylon are used, the more preferred effects are obtained.

The present invention is explained in more detail by reference to the examples and comparative examples, but the invention is not limited to those examples.

In each example and comparative example shown below, a polyphenylene ether, a compatibilizing agent, a rubber, and optionally, a radical initiator were first supplied to a 1st feed inlet of a twin-screw extruder, TEM 50 (trade name, manufactured by Toshiba Machine Co., Ltd.), and after melt-kneading the mixture at a cylinder temperature of 260° C., remaining components were supplied from a 2nd feed inlet located between the 1st feed inlet and the die followed by further melt-kneading the resulting mixture. After cooling the molten resin extruded from the die in a water bath, the extruded resin was formed into pellets with a strand cutter.

After drying the pellets thus obtained with hot blast at 120° C. for 2 hours, the pellets were injection molded by NESTARL injection molding machine, SYCAP 110/50 (trade name, manufactured by Sumitomo Heavy Industries, Ltd.) at a cylinder temperature of 290° C., an injection pressure of 1,200 kg/cm$^2$, and a mold temperature of 80° C. to obtain each test piece.

Each pellet and each test piece thus obtained were tested by the following methods, and data for each pellet and test piece were obtained.

Melt Index (MI):

The pellet of each resin composition before molding and the cubic pellet of about 5 mm square obtained from the molded product formed by injection molding the same pellets of the resin composition with a cutting nipper were vacuum dried at 140° C. for 4 hours, and the melt index of each pellet under a load of 10 kg at 280° C. was determined.
Appearance of Molded Product:

The surface of the molded product of each test piece of 3.2 mm thickness for an Izod Impact test obtained by injection molding was visually observed.

For obtaining each resin composition used in the examples and the comparative examples, the raw materials shown below were provided.
Polyphenylene Ether (PPE):

In the examples, a polyphenylene ether obtained by homopolymerizing 2,6-dimethyl phenol, the logarithmic viscosity of the polyphenylene ether measured in the chloroform solution thereof (concentration: 0.5 g/dl) at 30° C. being 0.46, was used.
Polyamide (PA):

Nylon 6 having a number average molecular weight of 12,500.
Rubbery Material:

Styrene-butadiene-styrene block copolymer, Califlex TR1101 (trade name, made by Shell Chemical Co.).
Compatibilizing Agent:

Maleic anhydride (MAH)
Radical Initiator (PO):

Dicumyl peroxide
Alkali Earth Metal Oxide:

Calcium oxide (CaO), magnesium oxide (MgO)
Inorganic Filler:

Mica: Clarite Mica 400 w (trade name, made by Kuraray Co., Ltd.)

Talc: Micron White #5000 (trade name, made by Hayashi Kasei K.K)

EXAMPLES 1 TO 4 AND COMPARATIVE EXAMPLE 1

The compounding compositions and the measurement results of the properties thereof are shown in Table 1 below.

TABLE 1

| Component | Example 1 | Example 2 | Example 3 | Example 4 | Comparative Example 1 |
|---|---|---|---|---|---|
| PPE | 45 | 45 | 45 | 45 | 45 |
| MAH | 0.5 | 0.5 | 0.5 | 0.5 | 0.5 |
| PO | 0 | 0 | 0 | 0.1 | 0 |
| PA | 45 | 45 | 45 | 45 | 45 |
| TR 1101 | 10 | 10 | 10 | 10 | 10 |
| CaO | 0.05 | 0.5 | 1.0 | 0.5 | 0 |
| Results MI (g/10 minutes) | | | | | |
| Pellet | 58 | 40 | 40 | 32 | 70 |
| Molded Product | 78 | 51 | 49 | 38 | 120 |
| Appearance of Molded Product | good | good | good | good | good |

EXAMPLES 5 TO 8 AND COMPARATIVE EXAMPLES 2 AND 3

Each of the filler-reinforced samples having the compositions shown in Table 2 below was granulated and the properties of each sample measured are shown in Table 2.

TABLE 2

| Components | Example 5 | Example 6 | Example 7 | Example 8 | Comparative Example 2 | Comparative Example 3 |
|---|---|---|---|---|---|---|
| PPE | 35 | 35 | 35 | 35 | 35 | 35 |
| MAH | 0.5 | 0.5 | 0.5 | 0.5 | 0.5 | 0.5 |
| PA | 45 | 45 | 45 | 45 | 45 | 45 |
| Talc | 20 | 20 | 0 | 20 | 20 | 0 |
| Mica | 0 | 0 | 20 | 0 | 0 | 20 |
| CaO | 0.1 | 1.0 | 1.0 | 0 | 0 | 0 |
| MgO | 0 | 0 | 0 | 1.0 | 0 | 0 |
| Results MI (g/10 minutes) | | | | | | |
| Pellet | 74 | 47 | 38 | 56 | 85 | 65 |
| Molded Product Appearance | 48 | 46 | 39 | 51 | 45 | 54 |
| Occurrence of silver streak | less | none | none | none | many | many |

It can be seen from the results of the examples and the comparative examples shown in the Table above that the resin compositions of the present invention show small change in the melt flowability before and after molding and therefore are suitable for recycling.

As described above, the present invention can provide a resin composition showing very small change in the melt flowability before and after injection molding and suitable for recycle moldability by compounding an alkali earth metal oxide with a polyphenylene ether/polyamide resin composition. Also, it is clear that a defective phenomenon called "silver streak" is liable to form on the surface of the injection molded product in a filler-compounded resin but addition of an alkali earth metal oxide can prevent formation of the "silver streak" phenomenon and addition of an alkali earth metal oxide is very effective to improve the quality of the molded products.

While the invention has been described in detail and with reference to specific embodiments thereof, it will be apparent to one skilled in the art that various changes and modifications can be made therein without departing from the spirit and scope thereof.

What is claimed is:

1. A resin composition having an improved recycling property, comprising:

(a) from 10 to 80 parts by weight of a polyphenylene ether, (b) from 90 to 20 parts by weight of a polyamide, (c) from 0.05 to 25 parts by weight per 100 parts by weight of said polyphenylene ether (a) and said polyamide (b) of a compatibilizing agent, and (d) from 0.001 to 10 parts by weight per 100 parts by weight of said polyphenylene ether (a) and said polyamide (b) of at least one alkali earth metal oxide selected from the group consisting of beryllium oxide, magnesium oxide, calcium oxide, and barium oxide.

2. The resin composition of claim 1, wherein said polyphenylene ether (a) is a polymer obtained by oxidative-polymerizing at least one phenol compound of the formula

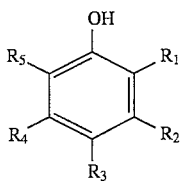

wherein $R_1$, $R_2$, $R_3$, $R_4$ and $R_5$ each represents hydrogen atom, a halogen atom, a hydrocarbon group or a substituted hydrocarbon group, provided that at least one of $R_1$ to $R_5$ is hydrogen atom, with oxygen or an oxygen-containing gas using an oxidative coupling agent.

3. The resin composition of claim 1, wherein the amount of said polyphenylene ether (a) is from 20 to 80 parts by weight.

4. The resin composition of claim 1, wherein said polyamide (b) is at least one polyamide selected from the group consisting of homopolyamides or copolyamides obtained by polymerization of lactam or an aminocarboxylic acid, homopolyamides or copolyamides obtained by polycondensation of diamine and a dicarboxylic acid, and mixtures thereof.

5. The resin composition of claim 1, wherein said alkali earth metal oxide (d) is present in said composition in an amount from 0.001 to 5 parts by weight.

6. The resin composition of claim 1, wherein said alkali earth metal oxide (d) is present in said composition in an amount from 0.1 to 3 parts by weight.

7. The resin composition of claim 1, further comprising a rubbery material (e) in an amount up to 100 parts by weight per 100 parts by weight of said polyphenylene ether (a) and said polyamide (b).

8. The resin composition of claim 7, wherein said rubbery material (e) is a rubbery material which is used to improve impact characteristics of a polyphenylene ether/polyamide resin composition.

9. The resin composition of claim 7, wherein said rubbery material (e) is present in said composition in an amount up to 70 parts by weight per 100 parts by weight of said polyphenylene ether (a) and said polyamide (b).

10. The resin composition of claim 1, further comprising an inorganic filler (f) in an amount up to 200 parts by weight per 100 parts by weight of said polyphenylene ether (a) and said polyamide (b).

11. The resin composition of claim 10, wherein said inorganic filler (f) is present in said composition in an amount up to 100 parts by weight per 100 parts by weight of said polyphenylene ether (a) and said polyamide (b).

* * * * *